Jan. 8, 1935.　　　T. H. NAKKEN　　　1,987,205
LIGHT COUPLED PROJECTOR
Filed March 19, 1931　　3 Sheets-Sheet 1

INVENTOR
THEODORUS H. NAKKEN
BY
ATTORNEY

Patented Jan. 8, 1935

1,987,205

UNITED STATES PATENT OFFICE 1,987,205

LIGHT COUPLED PROJECTOR

Theodorus H. Nakken, Forest Hills, N. Y., assignor to Nakken Patents Corporation, a corporation of Delaware Application March 19, 1931, Serial No. 523,697

5 Claims. (Cl. 179—100.3)

This invention relates to sound projectors or apparatus adapted to reproduce sound from a travelling photographic sound record. In this apparatus it is customary to employ amplifier tubes in special circuit arrangement with a light sensitive element, preferably a photoelectric cell. It has been found when such an amplifier assemblage, which may be called a head amplifier, is embodied in the same frame or is supported from the same support with the mechanism moving the film, that microphonic disturbances introduce a problem.

An object of the present invention is to minimize microphonic disturbance in such an apparatus by separating and supporting the head amplifier separately from the projector mechanism and combining the two solely by means of the sound projecting beam of light.

A further object of the invention is to facilitate the practical relative positioning of such apparatus by reflecting the sound projecting light beam laterally to its normal direction at right angles to the portion of the film from which it is projecting sound images.

The above and further objects of the invention are to improve in general sound projectors. The following claims are directed to an illustrative embodiment of the invention described in the following specification and shown in the accompanying drawings solely for purposes of illustration and not limitation.

Figure 1:
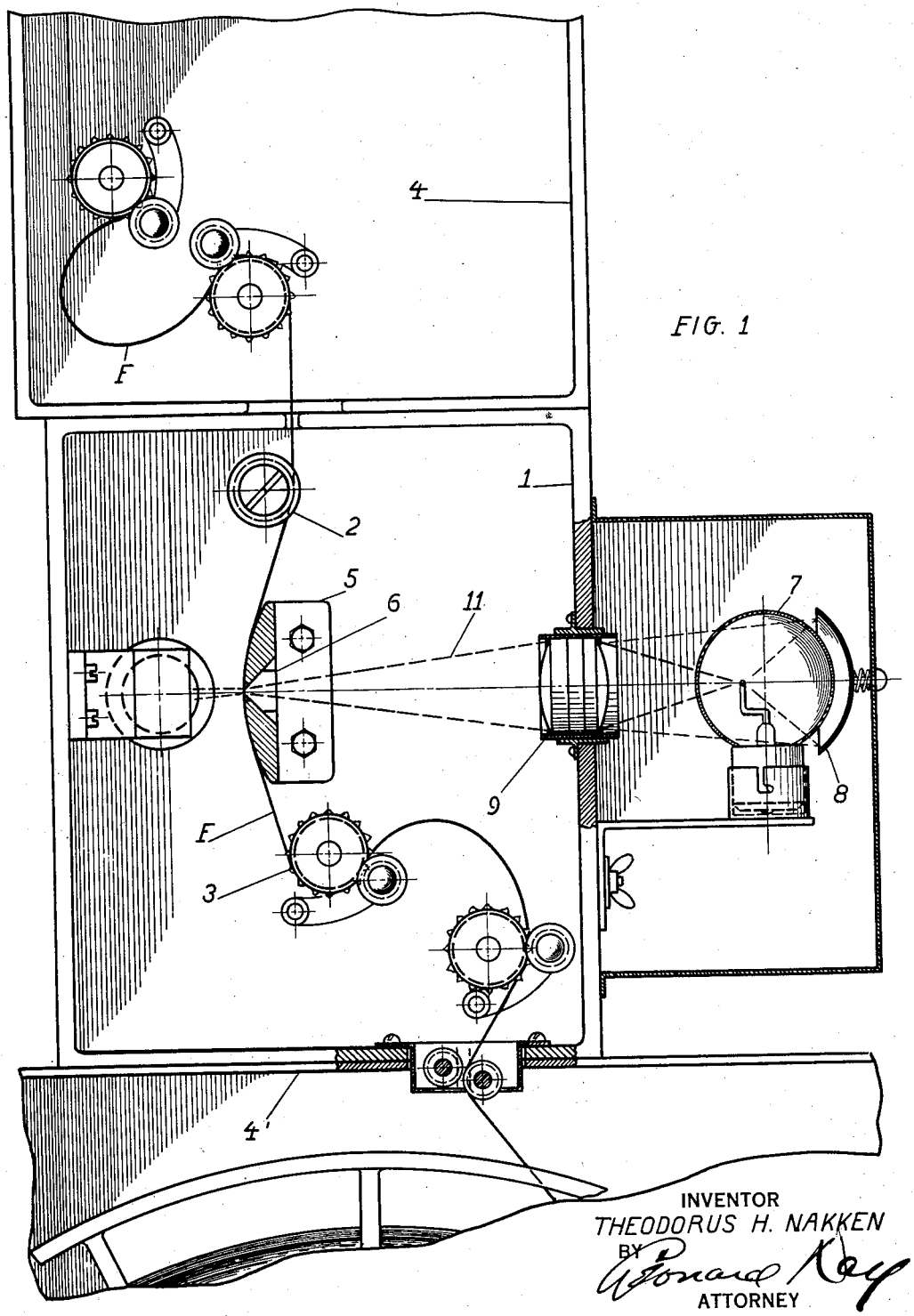
Figure 2:
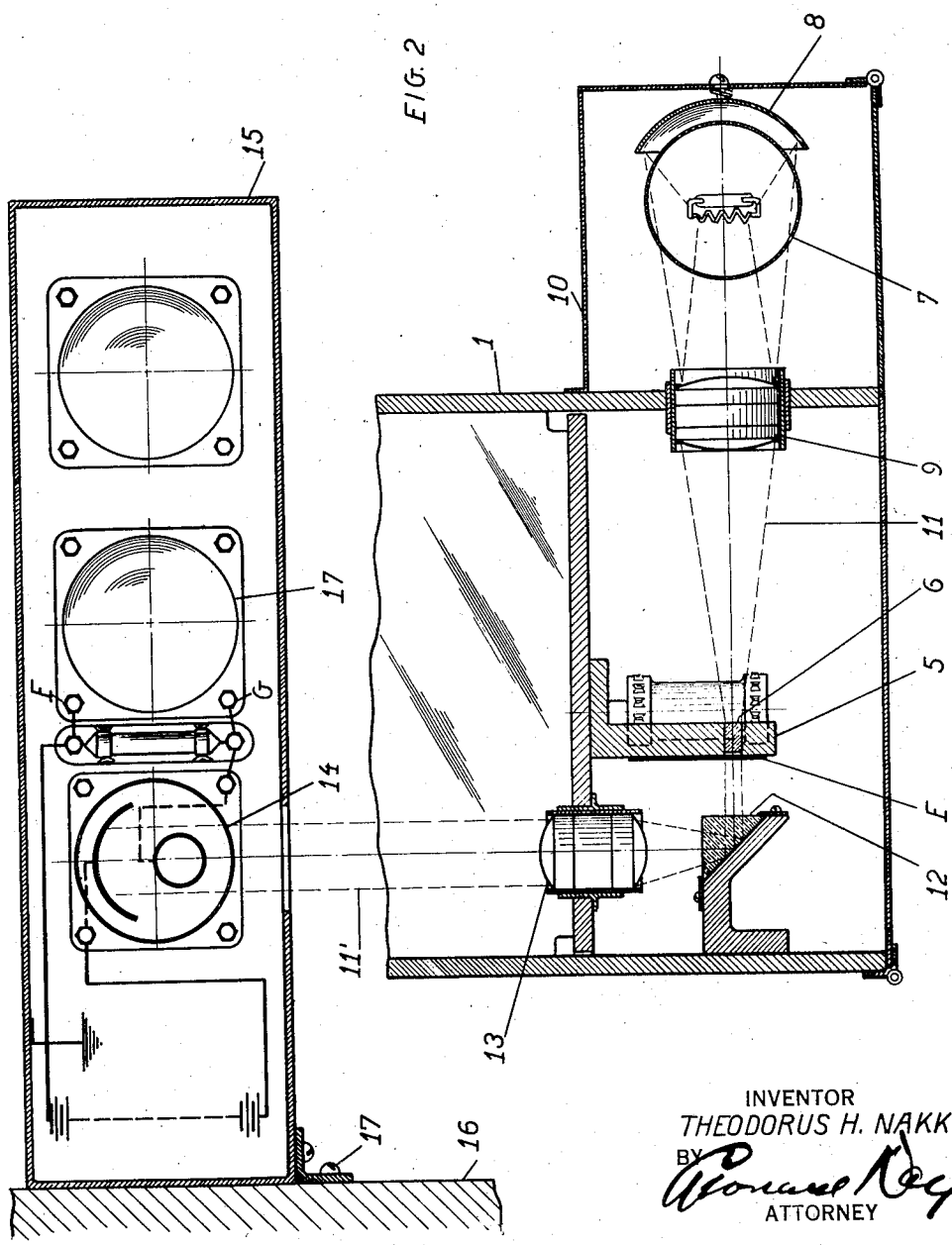
Figure 3:
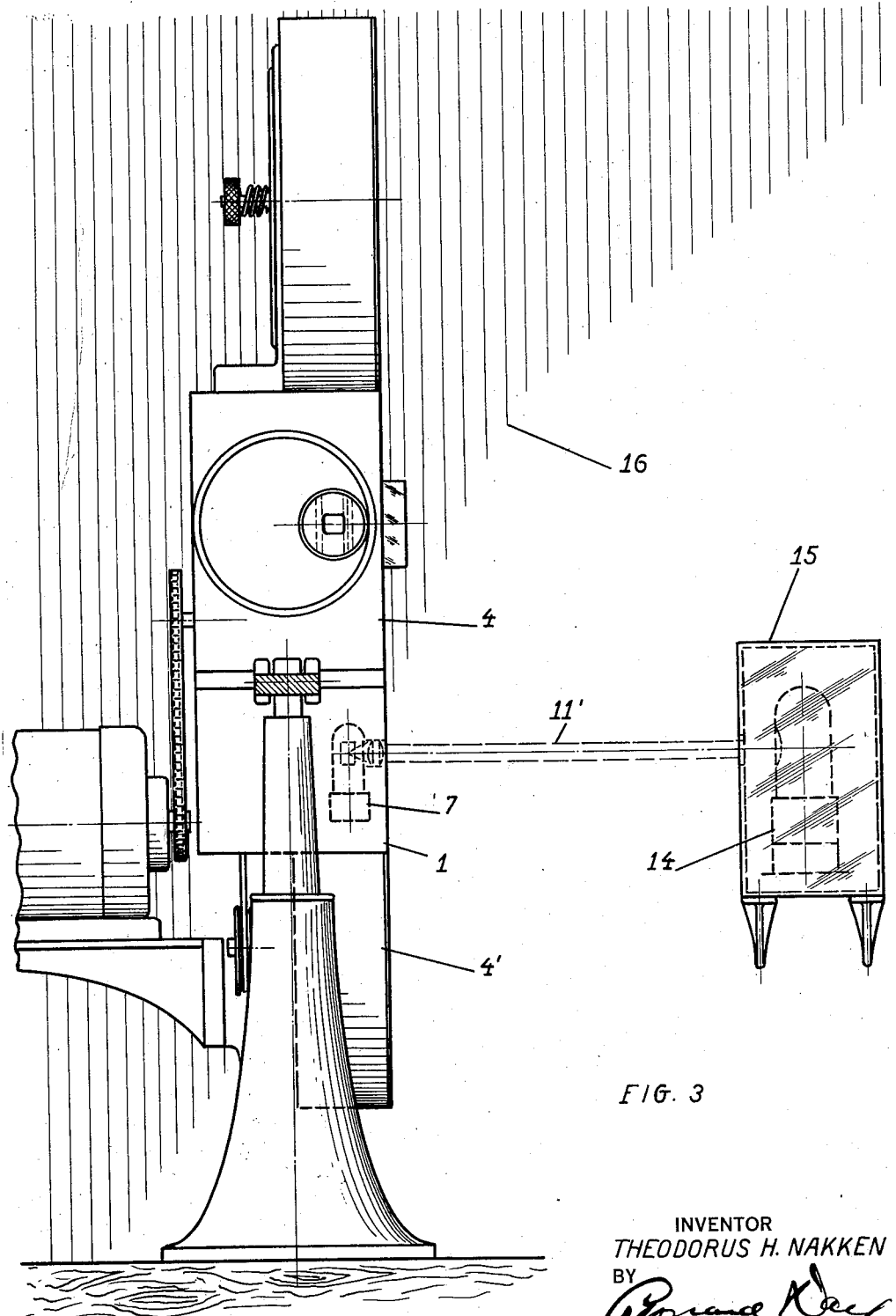

In the drawings, Fig. 1 is a side elevation partly in diagram indicating the relative position of the important parts; and Fig. 2 is a diagrammatic plan view of the combination shown in Fig. 1; and Fig. 3 is a diagrammatic rear elevation.

A sound head 1, which may be of any usual construction, embodies driving and guiding means such as synchronized sprockets 2 and 3, suitably driven as by combination with any commercial motion picture projector 4 and 4'. The part of the projector indicated by 4' may be regarded as the independent support usually mounted on a suitable foundation. In the sound head is a sound gate 5 which may comprise one of my light wedges 6 described in detail in my copending applications. 7 indicates a projector lamp and suitable optical means such as the reflector 8 and lens 9, preferably mounted in the extension 10 so as to project the sound projection beam of light 11 into the wedge 6 so that a light line in the neighborhood of slightly less than .001" wide is projected through the film F and the sound gate caused to be moved continuously and preferably at a uniform rate of speed. After emerging through the film F, a reflector 12, suitably mounted and preferably in the form of a total reflection prism, intercepts the beam and reflects it laterally from its initial direction preferably at right angles through a condenser lens system 13 where the reflected beam 11' extends in a direction easily to be intercepted by an independently mounted light sensitive means such as the photoelectric cell 14 constituting a part of the head amplifier 15. The head amplifier may take the form of a suitable case mounted directly on the wall 16 of the booth as by means of screws 17. Objectively, however, it is merely necessary that it have independent support from a suitable foundation independent relatively to the projector mechanism 1, 4, 4'.

In the head amplifier illustrated, the photoelectric cell 14 is shown combined by means of a Nakken circuit with a triode amplifier tube 17 beyond which as many stages of amplification as may be necessary may be provided.

The elements going to make up this apparatus may be made of cast aluminum or any suitable and usual structural material for apparatus of this kind.

What I claim and desire to secure by United States Letters Patent is:

1. In apparatus for reproducing sound from a photographic sound record, projector means comprising, a sound gate; means for moving a film bearing a photographic sound record cooperatively across said gate; an exciter lamp and associated optical system for projecting a sound projecting beam of light through said sound gate; a reflector for deflecting said sound beam laterally relatively to its initial direction in combination with a separate head amplifier including a photoelectric cell and an operatively connected amplifier tube positioned so that said photoelectric cell is adapted to intercept said reflected sound beam; and independent mountings and supports for said sound head and said projector means.

2. In combination, projector mechanism for operating a film bearing a photographic sound record having its own supporting frame including an exciter and optical means for projecting a sound beam of light substantially at right angles to and through the sound record portion of a film, and means for reproducing said sound beam laterally to its initial direction; a head amplifier comprising a light sensitive, electrically responsive element adapted to intercept the reflected portion of said light beam; and means for supporting said head amplifier independently of the support for said projector mechanism.

3. In a sound-on-film projector, a sound head;

means for supporting said sound head from a foundation; driving means in said sound head for imparting continuous motion to a film; means for projecting a sound projecting light beam across the path of the film; a reflector for reflecting said sound beam laterally to its initial direction; a light sensitive, electrically responsive element positioned to intercept said reflected light beam; and means for supporting said light sensitive, electrically responsive element independently of said sound head.

4. Projection apparatus for reproducing a photographic sound record from a travelling film, including suitable driving and guiding mechanism for the film; a projector housing having a light exit opening; an exciter lamp and optical system for projecting an operative sound projection beam through the film and out through said opening, in combination with a separate head amplifier including means for transforming light variations into electric current variations, including a light sensitive, electrically responsive element positioned to intercept said light beam; and separate supports for said housing and head amplifier.

5. In apparatus for reproducing sound from a photographic sound record, projector means comprising a sound gate; means for moving a film bearing a photographic sound record cooperatively across said gate; an exciter lamp and associated optical system for projecting a sound projecting beam of light through said sound gate and photographic sound record; a deflector for deflecting said sound beam laterally relatively to its initial direction; a head amplifier including a photoelectric cell and an operatively connected amplifier tube positioned so that said photoelectric cell is adapted to intercept said deflected sound beam; and independent mountings and supports for said exciter lamp and said photoelectric cell.

THEODORUS H. NAKKEN.